US010212752B1

(12) United States Patent
Poduska et al.

(10) Patent No.: US 10,212,752 B1
(45) Date of Patent: Feb. 19, 2019

(54) SIMULTANEOUS OPERATION OF MULTIPLE COMMUNICATIONS PROTOCOLS

(71) Applicant: Rockwell Collins, Inc., Cedar Rapids, IA (US)

(72) Inventors: Matthew J. Poduska, Mount Vernon, IA (US); Ryan J. Coppa, Cedar Rapids, IA (US); Sarah A. Miller, Cedar Rapids, IA (US); James A. Stevens, Lucas, TX (US); Chad E. Hughes, Cedar Rapids, IA (US)

(73) Assignee: ROCKWELL COLLINS, INC., Cedar Point, IA (US)

( * ) Notice: Subject to any disclaimer, the term of this patent is extended or adjusted under 35 U.S.C. 154(b) by 225 days.

(21) Appl. No.: 15/222,925

(22) Filed: Jul. 28, 2016

(51) Int. Cl.
*H04W 4/00* (2018.01)
*H04W 76/15* (2018.01)
*H04B 7/185* (2006.01)
*H04L 27/26* (2006.01)

(52) U.S. Cl.
CPC ........ *H04W 76/15* (2018.02); *H04B 7/18513* (2013.01); *H04B 7/18515* (2013.01); *H04B 7/18517* (2013.01); *H04B 7/18539* (2013.01); *H04L 27/2657* (2013.01)

(58) Field of Classification Search
CPC ................ H04W 76/15; H04W 76/025; H04B 7/18539; H04B 7/18513; H04B 7/18517
See application file for complete search history.

(56) References Cited

U.S. PATENT DOCUMENTS

| 9,961,587 B2 * | 5/2018 | Hecht | H04W 28/06 |
| 2007/0036142 A1 * | 2/2007 | Veschi | H04B 7/18582 370/352 |
| 2010/0039983 A1 * | 2/2010 | Yee | H04B 7/18539 370/316 |
| 2012/0295537 A1 * | 11/2012 | Zaruba | H04B 7/18506 455/12.1 |
| 2017/0047986 A1 * | 2/2017 | Petrovic | H04B 7/18513 |

* cited by examiner

*Primary Examiner* — Abdelnabi O Musa
(74) *Attorney, Agent, or Firm* — Donna P. Suchy; Daniel M. Barbieri

(57) ABSTRACT

Embodiments of the inventive concepts disclosed herein are directed to systems and methods for operating in multiple transmissions modes for satellite communications. A controller of a radio device may set a transmission mode of a single transceiver chain to a first communications protocol. The single transceiver chain may communicate with a satellite antenna using the first communications protocol. The controller may modify the transmission mode of the single transceiver chain from the first communications protocol to a second communications protocol. The controller may maintain synchronization for the first communications protocol. The single transceiver chain may transmit a first signal to the satellite using the second communications protocol, responsive to modifying the transmission mode. The single transceiver chain may simultaneously receive a second signal using the first communications protocol and the synchronization, and a third signal using the second communications protocol.

20 Claims, 3 Drawing Sheets

300

302 Setting, By a Controller of a Radio Device Having One or More Processors, a Transmission Mode of a Single Transceiver Chain Coupled to the Controller to a First Communications Protocol

304 Communicating, by the Single Transceiver Chain, with a Satellite Using the First Communications Protocol

306 Modifying, by the Controller, the Transmission Mode of the Single Transceiver Chain From the First Communications Protocol to a Second Communications Protocol

308 Maintaining, by The Controller, Synchronization for the First Communications Protocol

310 In Response to Modifying the Transmission Mode, Transmitting, by the Single Transceiver Chain, a First Signal to the Satellite Using the Second Communications Protocol

312 Receiving, by the Single Transceiver Chain From the Satellite, a Second Signal Using the First Communications Protocol and the Synchronization for the First Communications Protocol, and a Third Signal Using the Second Communications Protocol

FIG. 3

SIMULTANEOUS OPERATION OF MULTIPLE COMMUNICATIONS PROTOCOLS

BACKGROUND

Ground-to-satellite and satellite-to-satellite communications have been integral aspects of telecommunications for some time. As such, some satellite and radio communication devices may be operating using older, out-of-date communications protocols to transmit, receive, and process signals, whereas other communication devices may only be operating using newer, up-to-date communications protocols. However, users may want to access different data or waveforms conveyed via two or more communications protocols simultaneously, so as to increase throughput or operate with multiple different applications for instance. Devices using one communications protocol may not be able to process or properly receive signals encoded in other communications protocols, for example legacy communications protocols. For instance, such devices may not have the hardware or resources configurable to receive data or waveforms conveyed via two or more communications protocols simultaneously, or may require two or more transceiver chains or channels to achieve this, which does not allow for reduced hardware requirements and cost savings. Overcoming these limitations would enable simultaneous access to different data or waveforms in a single efficient system.

SUMMARY

In one aspect, embodiments of the inventive concepts disclosed herein are directed to a method of operating in multiple transmission modes for satellite communication. A controller of a radio device having one or more processors may set a transmission mode of a single transceiver chain to a first communications protocol. The single transceiver chain may be coupled to the controller. The single transceiver chain may communicate, with a satellite using the first communications protocol. The satellite may be within a field of view of the antenna of the radio device. The controller may modify the transmission mode of the single transceiver chain from the first communications protocol to a second communications protocol. The controller may maintain synchronization for the first communications protocol. The single transceiver chain may transmit a first signal to the satellite using the second communications protocol, responsive to modifying the transmission mode. The single transceiver chain may simultaneously receive a second signal using the first communications protocol and the synchronization, and a third signal using the second communications protocol.

In some embodiments, and in accordance with the inventive concepts disclosed herein, maintaining the synchronization for the first communications protocol may further include receiving a frame synchronization identifier for the first communications protocol from the satellite and storing the frame synchronization identifier for the first communications protocol. In some embodiments, and in accordance with the inventive concepts disclosed herein, maintaining the synchronization for the first communications protocol may further include incrementing, at periodic intervals, a frame synchronization count for the first communications protocol and for the satellite.

In some embodiments, and in accordance with the inventive concepts disclosed herein, the controller may set a first frequency range of a first filter of the single transceiver chain for passing the second signal encoded in the first communications protocol received from the satellite. The controller may set a second frequency range of a second filter of the single transceiver chain for passing the third signal encoded in the second communications protocol received from the satellite. The second frequency range may differ from the first frequency range. The single transceiver chain may include a transceiver chain of a software defined radio.

In some embodiments, and in accordance with the inventive concepts disclosed herein, modifying the transmission mode may further include modifying the transmission mode using a time schedule. The time schedule may specify a first time frame for transmission in the first communications protocol and a second time frame for transmission in the second communications protocol. In some embodiments, and in accordance with the inventive concepts disclosed herein, the single transceiver chain may receive, from the satellite, a mode identification signal indicating at least one of termination of transmissions in the first communications protocol and commencement of transmissions in the second communications protocol. Modifying the transmission mode may further include modifying the transmission mode of the single transceiver chain responsive to receiving the mode identification signal. In some embodiments, and in accordance with the inventive concepts disclosed herein, the controller may tune the antenna to a frequency range that includes a first carrier frequency of the first communications protocol and a second carrier frequency of the second communications protocol to receive, from the satellite, the second signal using the first communications protocol and the third signal using the second communications protocol.

In a further aspect, embodiments of the inventive concepts disclosed herein are directed to a method for operating in multiple transmissions modes for satellite communications. The controller of a radio device having one or more processors may set a transmission mode of a single transceiver chain to a first communications protocol. The single transceiver chain may be coupled to the controller. The single transceiver chain may include a first receiver, a second receiver, and a transmitter. The first receiver and the transmitter may communicate, via an antenna of the radio device with a satellite using the first communications protocol. The satellite may be within a field of view of the antenna of the radio device. The controller may modify the transmission mode of the single transceiver chain from the first communications protocol to a second communications protocol. The controller may maintain synchronization with the satellite for the first communications protocol. The transmitter may transmit a first signal to the satellite using the second communications protocol, responsive to modifying the transmission mode. From the satellite, the first receiver may receive a second signal using the first communications protocol and simultaneously the second receiver may receive a third signal using the second communications protocol.

In some embodiments, and in accordance with the inventive concepts disclosed herein, maintaining the synchronization may further include the first receiver storing, responsive to modifying the transmission mode to the second communications protocol, a frame synchronization identifier for the first communications protocol received from the satellite. The single transceiver chain may process the second signal using the frame synchronization identifier received from the satellite, subsequent to modifying the transmission mode from the first communications protocol to the second communications protocol.

In some embodiments, and in accordance with the inventive concepts disclosed herein, the first receiver may pass the second signal having a first frequency range and encoded in the first communications protocol received from the satellite. The first receiver may pass the third signal having a second frequency range and encoded in the second communications protocol received from the satellite. The second frequency range may differ from the first frequency range. The transmitter may pass the first signal having the second frequency range encoded in the second communications protocol transmitted to the satellite.

In some embodiments, and in accordance with the inventive concepts disclosed herein, the first receiver may receive, from the satellite, a mode identification signal indicating at least one of a termination of communications in the first communications protocol and a commencement of communications in the second communications protocol. Modifying the transmission mode may further include modifying the transmission mode of the single transceiver chain responsive to receiving the mode identification signal. Maintaining the synchronization may further include maintaining the synchronization for the first communications protocol, responsive to determining that the satellite is configured to transmit signals encoded in the first communications protocol and the second communications protocol.

In some embodiments, and in accordance with the inventive concepts disclosed herein, setting the transmission mode to the first communications protocol may further include disallowing transmission using the second communications protocol to the satellite by the transmitter. Modifying the transmission mode to the second communications protocol may further include disallowing transmission using the first communications protocol to the satellite by the transmitter.

In a further aspect, embodiments of the inventive concepts disclosed herein are directed to a system for operating in multiple transmission modes for satellite communications. The system may include a single transceiver chain of a radio device having one or more processors and a controller of the radio device. The controller may be coupled to the single transceiver chain. The controller may set a transmission mode of the single transceiver chain of the radio device to a first communications protocol. The single transceiver chain may communicate, via an antenna of the radio device with a satellite using the first communications protocol. The satellite may be within a field of view of the antenna of the radio device. The controller may modify the transmission mode of the single transceiver chain from the first communications protocol to a second communications protocol. The controller may maintain synchronization for the first communications protocol. The single transceiver chain may transmit a first signal to the satellite using the second communications protocol, responsive to the modification of the transmission mode. The single transceiver chain may simultaneously receive, from the satellite, a second signal using the first communications protocol and the synchronization, and a third signal using the second communications protocol.

In some embodiments, and in accordance with the inventive concepts disclosed herein, the controller may receive a frame synchronization identifier for the first communications protocol from the satellite and store the frame synchronization identifier for the first communications protocol. In some embodiments, and in accordance with the inventive concepts disclosed herein, the controller may disable transmissions to the satellite using the first communications protocol, responsive to the modification of the transmission mode from the first communications protocol to the second communications protocol.

In some embodiments, and in accordance with the inventive concepts disclosed herein, the single transceiver chain may comprise a transceiver chain of a software defined radio (SDR). The single transceiver chain may include a first filter and a second filter. The controller may set a first frequency range of the first filter for passing the second signal encoded in the first communications protocol received from the satellite. The controller may set a second frequency range of the second filter for passing the third signal encoded in the second communications protocol received from the satellite. The second frequency range may differ from the first frequency range.

In some embodiments, and in accordance with the inventive concepts disclosed herein, the controller may modify the transmission mode using a time schedule. The time schedule may specify a first time frame for transmissions in the first communications protocol and a second time frame for transmissions in the second communications protocol.

In some embodiments, and in accordance with the inventive concepts disclosed herein, the single transceiver chain may receive, from the satellite, a mode identification signal indicating at least one of a termination of communications in the first communications protocol and a commencement of communications in the second communications protocol. The controller may modify the transmission mode of the single transceiver chain, responsive to the receipt of the mode identification signal. In some embodiments, and in accordance with the inventive concepts disclosed herein, the controller may tune the antenna to a frequency range that includes a first carrier frequency of the first communications protocol and a second carrier frequency of the second communications protocol to receive, from the satellite, the second signal using the first communications protocol and the third signal using the second communications protocol.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 3 shows a block diagram of an example embodiment of a method of operating in multiple transmissions modes for satellite communications in accordance with some embodiments of the inventive concepts disclosed herein.

DETAILED DESCRIPTION

Figure 1:
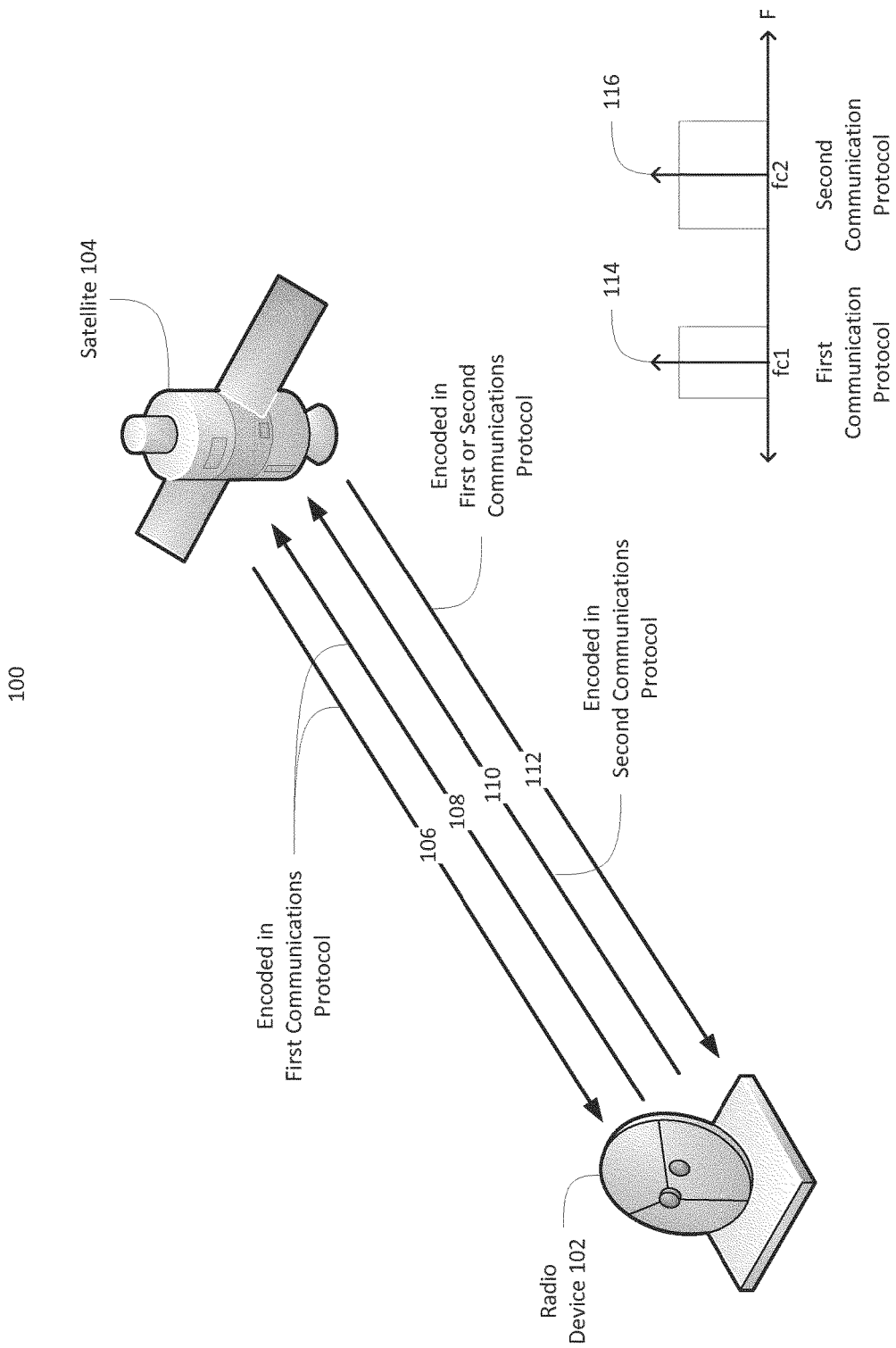
FIG. 1 is a block diagram of an example embodiment of a system for operating in multiple transmissions modes for satellite communications in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

In some aspects, embodiments of the inventive concepts disclosed herein are directed to a system for operating in multiple transmission modes for satellite communications. Some satellites may be capable of transmitting, receiving, and processing signals encoded in various communications protocols, such as Mobile User Objective System (MUOS) and Integrated Waveform Demand Assigned Multiple Access (IW/DAMA) waveforms, among others. Software-defined radio (SDR) devices may include hardware or a combination hardware and software to achieve ground-to-satellite, satellite-to-satellite, or even ground-to-satellite communications. Such SDR devices may include a transceiver chain (sometimes referred to as a "channel") to transmit, receive, and/or process signals and a controller to modify or adjust the functionalities of the transceiver chain, instead of multiple channels/chains or SDR channels/chains. The SDR device may include or use a hardware chain tunable to different UHF ranges or carrier frequencies. In accordance with the inventive concepts disclosed herein, an SDR device may be configured, modified, or otherwise programmed to dynamically transmit, receive, and/or process signals across these various communications protocols. For instance, a user may want to access via this SDR device different data or waveforms conveyed via two or more communications protocols simultaneously, so as to visualize and/or control the data or waveforms for instance. Leveraging SDR devices in such a manner may eliminate installing or dedicating different, multiple radio devices or transceiver chains for the various communications protocols, thereby reducing the physical bulk and/or complexity of the overall communication system, and/or reducing costs. In addition, this may expand the number of satellite communication systems that SDR devices may communicate with.

Referring to FIG. 1, one example embodiment of a system for operating in multiple transmission modes for satellite communications is depicted. The system 100 may include a radio device 102 and a satellite 104. The radio device 102 may be part of a radio tower, a mobile device, a vehicle, or an airplane on the ground or another satellite in space or any other radio system communicating with the satellite 104. The radio device 102 may include a single transceiver chain for transmitting, receiving, and processing signals in one or more communications protocols, and a controller to modify the transmission mode of the transceiver chain. The satellite 104 may be in space, e.g., in an orbit around the Earth, or may be a surrogate satellite in a high-altitude aircraft. The satellite 104 may include multiple transceivers and multiple antennae for each of the communications protocols. Each of the above-mentioned elements, modules, engines, or entities (and others disclosed herein) is implemented in hardware, or a combination of hardware and software. For instance, each of these elements, modules, engines, or entities can include any application, program, library, script, task, service, process or any type and form of executable instructions executing on hardware of the system. The hardware includes circuitry such as one or more processors, memory devices, connections or bus structures, communication interfaces, and/or radio antennae in one or more embodiments.

Within the system 100, when the respective antennae may be within a field of view, the radio device 102 and the satellite 104 may communicate with each other using various communications protocols. As depicted in the example in FIG. 1, and merely by way of illustration, there may be two communications protocols. The first communications protocol and the second communications protocol may use other encryption schema, encode signals differently, lie in separate ranges along the frequency spectrum (e.g., with carrier frequencies $f_{c_1}$ (114) and $f_{c_2}$ (116)), and/or use different code-division multiple access (CDMA) codes. For example, the first communications protocol may be, or associated with IW/DAMA, using time division multiple access to multiplex signals in the time domain. The first communications protocol may be operating at 5 kHz and 25 kHz Ultra High Frequency (UHF) channels. In addition, the second communications protocol may be, or associated with MUOS, using code division multiple access to multiplex signals with different coding schemes across the bandwidth. The second communications protocol may be operating on 5 MHz UHF satellite channel. There may be more than two communications protocol used by the radio device 102 and the satellite 104. Each of these schemes (e.g., IW/DAMA and MUOS) may provide or communicate signals, waveforms and/or data via the respective communications protocols. Examples of communications protocols that may be used by the radio device 102 and the satellite 104 may include CDMA (e.g., 3G, W-CMDA, etc.), time division multiple access (TDMA) (e.g., MIL-STD-188-182 and MIL-STD-188-183 DAMA, MIL-STD-188-181 dedicated channels, etc.), and orthogonal frequency-division multiplexing (OFDM) (e.g., CODFM, etc.), among others.

The radio device 102 and/or the satellite 104 may be capable of transmitting, receiving, and processing signals across various communications protocols. The satellite 104 may first transmit a signal 106 encoded in the first communications protocol. The signal 106 may be part of a broadcast to a multitude of radio devices. The radio device 102 may subsequently transmit a signal 108 also encoded in the first communications protocol to acknowledge receipt of the signal 106 received from the satellite 104. While communicating in the first communications protocol, the radio device 102 may maintain frame synchronizations for communications in the second communications protocol.

Subsequently, the communications protocol used may change from the first communications protocol to the second communications. The change between different communications protocol may be based on a time schedule or dynamic preference or configuration set by the radio device 102 or the satellite 104, or another administrative communications authority or may be done on demand or request by the radio device 102 (e.g., by a user of the radio device 102) and/or the satellite 104. In this scenario, the radio device 102 may change transmission or operation mode to allow for communications in the second communications protocol. In turn, the radio device 102 may transmit and/or receive signal 110 encoded in the second communications protocol in communication with the satellite 104 using the maintained framed synchronization. In some cases, the signal 110 may be communicated with (e.g., received from) another satellite different from the satellite 104. The radio device 102 may also maintain frame synchronizations for communications in the first communications protocol. Since the change in the transmission or operation mode may not be affecting the reception of signals encoded in the first communications protocol, the radio device 102 may continue to receive signals, such as signal 112, encoded in the first communications protocol or the second communications protocol. In this manner, the radio device 102 may transmit and receive signals across multiple communications protocols using a single transceiver channel or chain, thereby reducing physical bulk of the communications system and expanding the number of satellites that the radio device 102 may be in communications with. The single transceiver channel or chain may be designed and/or implemented to provide one transmit path and two receive (e.g., half duplex) paths, using a combination of hardware and software modules for instance. In such designs, the radio device 102 may transmit signals in one of the various communications protocols but may receive multiple signals in any of the communications protocols simultaneously.

Figure 2:
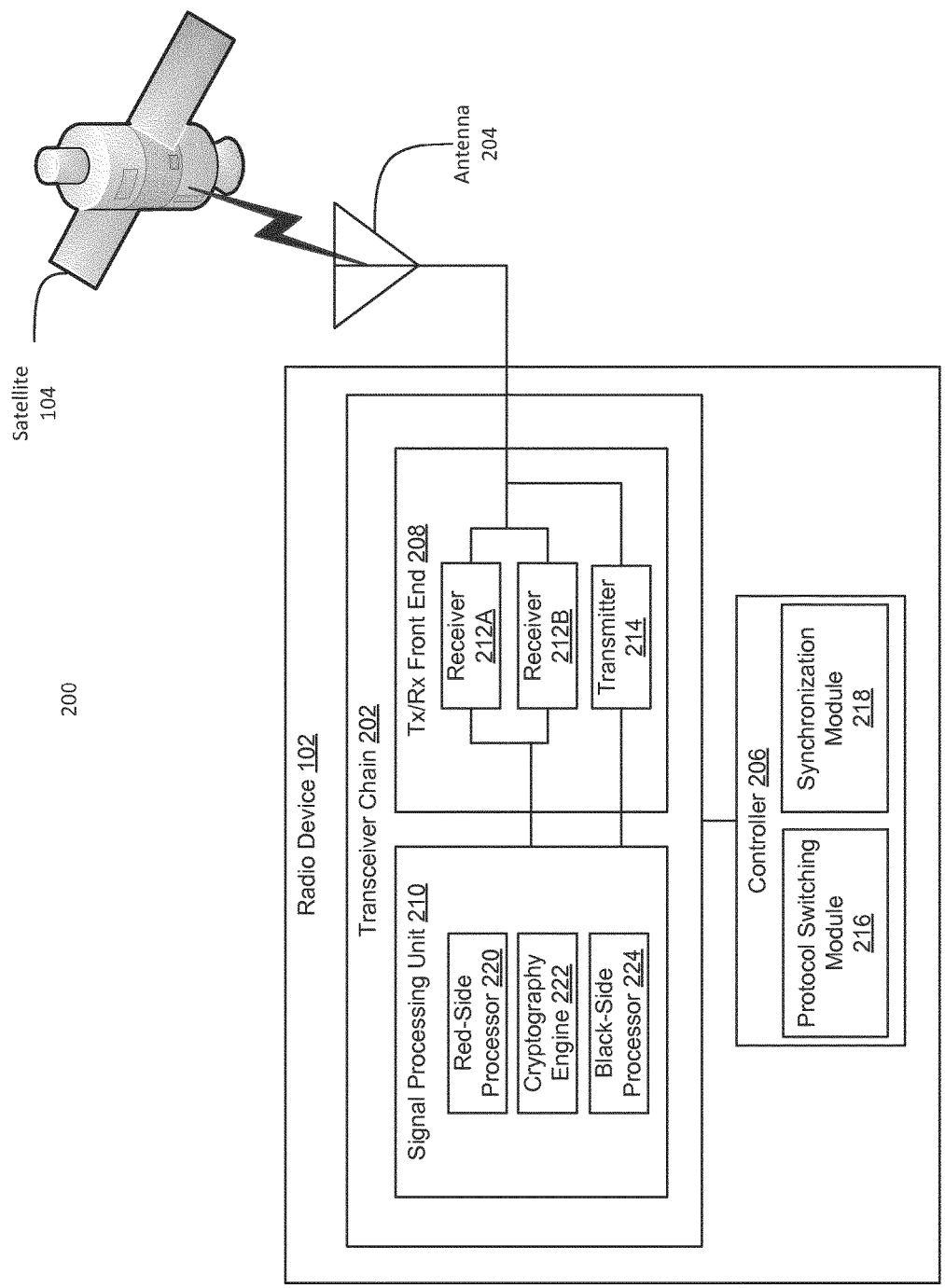
FIG. 2 shows a block diagram of another example embodiment of a system for operating in multiple transmissions modes for satellite communications in accordance with some embodiments of the inventive concepts disclosed herein.

Now referring to FIG. 2, depicted is an example embodiment of a system for operating in multiple transmission modes for satellite communications. In FIG. 2, the system 200 may include the radio device 102 and the satellite 104 communicating with each other using one or more communications protocols. In brief overview, the radio device 102 may include a transceiver chain 202, an antenna 204, and a controller 206. The transceiver chain 202 may include a transceiver chain (or channel) of an SDR device. The transceiver chain 202 may include a transmitter-receiver (Tx/Rx) front end 208 and/or a signal processing unit 210. The transceiver chain 202 may transmit and receive signals to and from the satellite 104 via the antenna 204. The transceiver chain 202 and the antenna 204 may be coupled to each other. The controller 206 may include a protocol switching module 216 and a synchronization module 218. The transceiver chain 202 and the controller 206 may be coupled to each other. In some embodiments, there may be multiple transceiver chains with similar functionality as the transceiver chain 202 within the radio device 102. In some embodiments, the radio device 102 may include functionality for less than two transceiver chains, e.g., the radio device 102 may include functionality for one and a half transceiver chains.

The satellite 104 may include one or more antennae for communicating with the radio device 102 using one or more communications protocol. Each of the antennae of the satellite 104 may be dedicated to one of the one or more communications protocol. The antenna 204 of the radio device 102 may be within a field of view of the antenna of the satellite 104. The antenna of the satellite 104 may also be within a field of view of the antenna 204 of the radio device 102. By way of illustration, the antenna 204 of the radio device 102 and the one or more antennae of the satellite 104 may include or correspond to a half-wave dipole, a dipole antenna (e.g., corner reflector or log-periodic), a monopole antenna (e.g., whip, mast, umbrella, or inverted F) a travelling wave antenna (e.g., helical or spiral), reflector antenna (e.g., corner or parabolic), an aperture antenna (e.g., parabolic, slot, horn, or dielectric), a microstrip antenna, an array antenna, or a loop antenna, among others.

In further detail, the transceiver chain 202 may communicate via the antenna 204 of the radio device 102 with the antenna of the satellite 204 using one or more communications protocols. The transceiver chain 202 may transmit signals via the antenna 204 of the radio device 102 to the antenna of the satellite 204 using one of the one or more communications protocols. Which one of the one or more communications protocols the transceiver chain 202 communicates, receives, or transmits signals in may be set, modified, or otherwise configured by the controller 206, as will be detailed further below. The transceiver chain 202 may transmit and receive signals via the antenna 204 to and from the antenna of the satellite 104 with the Tx/Rx front end 208 and process the signals with the signal processing unit 210.

The Tx/Rx front end 208 of the transceiver chain 202 may include one or more receivers 212A-N and a transmitter 214. The one or more receivers 212A-N may be coupled to the signal processing unit 210 to relay signals received from the satellite 104 via the antenna 204. The transmitter 214 may be coupled to the signal processing unit 210 to relay signals to be transmitted to the antenna of the satellite 104 via the antenna 204. In some embodiments, each of the one or more receivers 212 may be dedicated to receiving and processing signals using one of the one or more communications protocols at any time. For example, the first receiver 212A may receive signals from the satellite 104 that are encoded in the first communications protocol while the second receiver 215B may receive signals from the satellite 104 and encoded in the second communications protocol. In some embodiments, a single receiver 212 may simultaneously receive and process signals using any of the one or more communications protocol. For example, a single receiver 212 may simultaneously receive a first signal from the satellite 104 that are encoded in the first communications protocol and receive a second signal from the satellite 104 that are encoded in the second communications protocol, by multiplexing or allocating (via virtualization) one or more portions of the radio device 102 between the communications protocols, via software defined radio configuration for instance. The transmitter 214 may transmit signals using one of the one or more communications protocols as set or defined by the controller 206 at a time. For example, if transmission mode of the transmitter 214 is set to transmit in the first communications protocol, the transmitter 214 may transmit signals encoded in the first communications protocol.

In some embodiments, each of the one or more receivers 212A-N may pass signals having a frequency range associated with the respective communications protocols. In some embodiments, the frequency ranges may differ from one another. In other embodiments, the frequency ranges may overlap or be the same with one another (e.g., CDMA). The transceiver chain 202 may include a wideband receiver than supports or scans across frequencies including at least portions of frequency ranges of the respective communications protocols. In some embodiments, the first receiver 212A may pass a first signal having a first frequency range associated with the first communications protocol received from the satellite 104 and the second receiver 212B may pass a second signal having a second frequency range associated with the second communications protocol received from the satellite 104. In some embodiments, a single receiver 212 may pass both the first signal having the first frequency range and the second signal having the second frequency range. In such embodiments, the first signal and the second signal may be separated by additional processing and/or filtering in the Tx/Rx front end 208 or the signal processing unit 210.

In some embodiments, transmitter 214 may pass signals having a frequency range associated with the communications protocol corresponding to the transmission mode set by the controller 206. In some embodiments, the transmitter 214 may pass signals having all the frequency ranges associated with each of the one or more communications protocols for further processing in the signal processing unit 210. In some embodiments, each of one or more receivers 212A-N may include a filter to pass or suppress signals received from the satellite 104. The filter of each of the one or more receivers 212A-N may be set to a frequency range for passing communications using the respective communications protocol received from the satellite 104. In some embodiments, the transmitter 214 may include a filter to pass or suppress signals to be transmitted to the satellite 104. The filter of the transmitter 214 may be set to a frequency range for passing communications using the communications protocol set by the controller 206 to be transmitted to the satellite 104. Each filter may be implemented using hardware (e.g., analog filter) or a combination of hardware and software (e.g., digital filter).

The signal processing unit 210 may, for example, include a red-side processor 220, a cryptography engine 222, and/or black-side processor 224, among possibly others, to process signals received from the satellite 104 or about to be transmitted to the satellite 104. In some embodiments, the signals received from the satellite 104, or about to be transmitted from the satellite 104, may be encrypted. The red-side processor 220 may process or otherwise read plaintext information or decrypted data from signals. The cryptography engine 222 may encrypt or decrypt signals using any number of asymmetric or symmetric encryption schema, such as MD5 message-digest algorithm, RSA encryption algorithm, elliptic curve cryptography (ECC), cryptographic hash function (e.g., FSB, GCM, SHA-1, SHA-2, HMAC, etc.), or block cipher (e.g., Twofish, AES, DES, etc.), among others. The black-side processor 224 may process or read ciphertext information or encrypted data in signals.

The signal processing unit 210 may include other processing units and engines, different from the red side processor 220, a cryptography engine 222, and/or black-side processor 224 as in the example depicted in FIG. 2. For example, the signal processing unit 210 may include an analog-to-digital converter (ADC) to convert received signals, a digital-to-analog converter (DAC) to convert signals about to be transmitted, various filters (e.g., low-pass, band-pass, band-stop, high-pass, or any combination thereof), and/or buffers for temporarily storing signal data, among others. The signal processing unit 210 and the components or modules therein may be implemented using hardware, specialized microprocessors (DSPs), field-programmable gateway (FPGAs), or application-specific integrated circuits (ASICs), or a combination of software (with instructions stored on memory or other computer-readable media) and hardware.

The controller 206 may set, modify, or configure the transmission mode of the transceiver chain 202 and may maintain synchronization for the one or more communications protocols used in communications with the satellite 104. The transmission mode of the transceiver chain 202 may specify or define which communications protocol to use in transmitting signals by the Tx/Rx front end 208 to the satellite 104. In this framework, the transmission mode may also specify or define whether the transceiver chain 202 may transmit and/or receive signals in a full duplex mode or half-duplex (e.g., receive-only or emission control (EMCON) mode) mode with the satellite 104 for each of the one or more communications protocols. For example, the radio device 102 may support one communications protocol in full duplex, and simultaneously another communications protocol in half duplex (e.g. for signal transmission in radio-silent or EMCON mode). In some embodiments, the transmission mode may specify or define which communications protocol to use in encoding and decoding signals by the signal processing unit 210.

The protocol switching module 216 may set the transmission mode of the transceiver chain 202 or the Tx/Rx front end 208 to one of the one or more communications protocols. In some embodiments, the protocol switching module 216 may initially set the transmission mode of the single transceiver chain 202 to a default communications protocol. The default communications protocol may correspond, for example, to an up-to-date communications protocol, least up-to-date communications protocol, a communications protocol used by most satellite communications devices, among others. In some embodiments, the protocol switching module 216 may enable transmissions by the transceiver chain 202 or the Tx/Rx front end 208 to one of the one or more communications protocols. In some embodiments, the protocol switching module 216 may disable transmissions by the transceiver chain 202 or the Tx/Rx front end 208 to the remainder of the one or more communications protocols. For example, there may be two communications protocols, such as the first communications protocol or the second communications protocol. In this scenario, when the protocol switching module 216 sets the transmission mode of the transceiver chain 202 to the first communications protocol, the protocol switching module 216 may disable transmissions by the transceiver chain 202 in the second communications protocol (e.g., to operate in radio-silent or EMCON mode) and enable transmissions by the transceiver chain 202 in the first communications protocol.

The protocol switching module 216 may set a frequency range for each filter of the transceiver chain 202 for passing communications using the associated communications protocol. Each filter may be associated with at least one of the one or more communications protocols for signals received from or transmitted to the antenna of the satellite 104 via the antenna 204 of the radio device 102. For example, the protocol switching module 216 may set a first frequency range for a first filter for passing communications using a first communications protocol associated with the first frequency range and may set a second frequency range for a second filter for passing communications using a second communications protocol associated with the second communications protocol. The communications filtered by the first filter and the second filed may be further processed separately by the Tx/Rx front end 208 and the signal processing unit 210.

The protocol switching module 216 may tune or otherwise set the antenna 204 and/or receiver of the radio device 102 to a frequency range that includes one or more carrier frequencies of each of the one or more communications protocols used in communications between the radio device 102 and the antenna of the satellite 104. For instance, the radio device 102 may periodically or otherwise scan the frequency range to detect the presence of one or more of the carrier frequencies. For example, the first communications protocol may have two UHF channels with carrier frequencies of 5 kHz and 25 kHz and the second communications protocol may have one carrier frequency at the 5 MHz UHF channel. In this example, the protocol switching module 216 may tune the antenna to a frequency between these UHF channels to cover the carrier frequencies and to pass signals communications using the first communications protocol and the second communications protocol.

The protocol switching module 216 may determine whether the satellite 104 or the antenna(e) of the satellite 104 is configured to communicate using one or more communications protocols. In some embodiments, the protocol switching module 216 may determine whether the satellite 104 or the antenna(e) of the satellite 104 is configured to transmit signals encoded in any of the one or more communications protocol. In some embodiments, the protocol switching module 216 may identify an identifier associated with the satellite 104. In some embodiments, the protocol switching module 216 may compare the identifier associated with the satellite 104 with satellite identifiers listed in a database with communications protocol indicators. The database may be in memory at the radio device 102 or from another device communicatively linked with the radio device 102. The database may include a registry of satellite identifiers each with communications protocols capable of communicating in. For example, the identifier associated with the satellite 104 may be listed in the database as capable of communicating with the MUOS and IW/DAMA protocols. Based on the comparison of the identifier, the protocol switching module 218 may determine which of the one or more communications protocols the satellite 104 is configured to communicate in.

In some embodiments, the protocol switching module 216 may identify which of the one or more communications protocols the satellite 104 or the antenna(e) of the satellite 104 is configured to use, based on receiving signals or waveforms encoded in the respective communications protocols. In some embodiments, the protocol switching module 216 may identify which of the one or more communications protocols based on a frequency (e.g., a frequency range or carrier frequency) of the signals received from the satellite 104 via the Tx/Rx front end 208. For example, the second receiver 212B may receive signals within a carrier frequency associated with the MUOS communications protocol. In this scenario, the protocol switching module 216 may identify the carrier frequency of the received signals from the peak and determine that the satellite 104 is configured to transmit in the MUOS communications protocol.

The protocol switching module 216 may modify, change, or otherwise set the transmission mode of the transceiver chain 202, the Tx/Rx front end 208, the one or more receivers 212A-N, or the transmitter 214 to another communications protocol different from the current communications protocol. For example, the protocol switching module 216 may modify the transmission mode of the transceiver chain 202 from the first communications protocol to the second communications protocol or from the second communications protocol to the first communications protocol. In some embodiments, in modifying or changing the transmission mode of the transceiver chain 202, the protocol switching module 216 may disable transmissions of signals by the Tx/Rx front end 208 via the antenna 204 to the satellite 104 (for example, according to an EMCON mode). In some embodiments, the protocol switching module 216 may relay a command to the signal processing unit 210 to generate signals in frequencies associated with the communications protocol corresponding to the modified or next transmission mode. In some embodiments, in modifying or changing the transmission mode of the transceiver chain 202, the protocol switching module 216 may also disable receipt of signals by the Tx/Rx front end 208. In some embodiments, the protocol switching module 216 may set the filter of the Tx/Rx front end 208 or the one or more receives 212A-N to suppress signals in a frequency range associated with the previous used communications protocol.

In some embodiments, the protocol switching module 216 may modify the transmission mode of the transceiver chain 202 using a time schedule. The time schedule may be pre-defined (e.g., by a system administrator) or dynamically generated. The time schedule may specify a time frame for each of the one or more communications protocols used in communicating with the satellite 104. The time frames may range from nanoseconds to hours and days. For example, the time schedule may specify a first time frame for transmissions by the transmitter 214 in the first communications protocol and a second time frame for transmission s by the transmitter 214 in the second communications protocol. In some embodiments, the protocol switching module 216 may generate the time schedule for specifying the time frames for each of the one or more communications protocols based on any number of parameters (e.g., seeds for a pseudo-random number generator).

In some embodiments, the protocol switching module 216 may modify the transmission mode of transceiver chain 202, responsive to receiving a mode identification signal. The mode identification signal may be received via the antenna 204 from the satellite 104. In some embodiments, the mode identification signal may be received via an input/output (I/O) device at the radio device 102 or from another device communicatively linked to the radio device 102. The mode identification signal may indicate termination of transmissions in the current communications protocol or commencement of transmissions in the modified or next communications protocol. In some embodiments, the mode identification signal may indicate to the protocol switching module 216 which of the one or more communications protocols to change or switch to. By way of illustration, and in no way limited to the following communications protocol or schemes, the mode identification signal may specify termination of communications in the DAMA/IW communications protocol and commencement of communications in the MUOS communications protocol. The mode identification signal may also specify termination of full duplex or simplex communications in the DAMA/IW protocol, instead of specifying receive-only EMCON and the commencement of full duplex communications in the MUOS communications protocol.

The synchronization module 218 may maintain synchronization for each of the one or more communications protocols used in communications between the radio device 102 and the satellite 104. The synchronization may be used by the transceiver chain 202, the Tx/Rx front end 208, and/or the signal processing unit 210 to align processing of signals received from the satellite 104 and signals to be transmitted to the satellite 104. In some embodiments, the synchronization module 218 may maintain synchronization for the one or more communications protocols not corresponding to the current transmission mode. In some embodiments, the synchronization module 218 may change, modify, or switch the maintenance of the synchronization for the one or more communications protocols, responsive to the protocol switching module 216 setting, modifying, or changing the transmission mode. For example, the protocol switching module 216 may change the transmission mode of the transceiver chain 212 from the first communications protocol to the second communications protocol. In this case, the protocol switching module 216 may stop maintaining the synchronization for the second communications protocol and start maintaining the synchronization for the first communications protocol.

In certain embodiments, the protocol switching module 216 may maintain the synchronization for both communications protocols, e.g., for receiver operations. In some embodiments, the protocol switching module 216 may increment, at periodic intervals, a frame synchronization count for each of the communications protocols. The frame synchronization count may be maintained by a timer at the radio device 102 and may otherwise have the same functionalities and uses as the frame synchronization identifier. The maintenance of the synchronization for the first communications protocol and the second communications protocol may allow for seamless transitioning of transmissions by the radio device 102, when changing or modifying the transmission mode.

In some embodiments, the synchronization module 218 may receive a frame synchronization identifier for each of the one or more communications protocols used in communications from the satellite 104. The frame synchronization identifier may be received as part of the signals or communications using the respective communications protocol with the satellite 104. In some embodiments, the synchronization module 218 may store the frame synchronization identifier in memory at the radio device 102. The frame synchronization identifier may indicate a time for the start of the current frame or the end of the previous frame of the signals transmitted by the satellite 104 to the radio device 102. In some embodiments, the transceiver chain 202, the Tx/Rx front end 208, and/or the signal processing unit 210 may process signals received from the satellite 104 using the frame synchronization identifier. For example, the Tx/Rx front end 208 and/or signal processing unit 210 may use the frame synchronization identifier to align the processing of signals received from the satellite 104 and signals about to be transmitted to the satellite 104. In some embodiments, the transceiver chain 202, the Tx/Rx front end 208, and/or the signal processing unit 210 may switch or change which frame synchronization identifier to use in processing the signals received from the satellite 104 and signals to be transmitted to the satellite 104, responsive to the protocol switching module 216 setting, modifying, or changing the transmission mode.

Responsive to the modification or the change in the transmissions mode, the transceiver chain 202, the Tx/Rx front end 208, the one or more receivers 212A-N, or the transmitter 214 may initiate communications in the next communications protocol using the synchronization for the respective communications protocol. In some embodiments, the transceiver chain 202, the Tx/Rx front end 208, or the transmitter 214 may initiate transmissions of the signal encoded in the next communications protocol. In some embodiments, subsequent to the modification or change in the transmission, the transceiver chain 202 and/or the Tx/Rx front end 208 may continue to receive signals encoded in the previous communications protocol simultaneous to receiving signals encoded in the next communications protocol using a single receiver 212 or one or more receivers 212A-N. For example, the protocol switching module 216 may modify the transmission mode of the transceiver chain 202 from the first communications protocol to the second communications protocol. In this case, the transmitter 214 may halt transmissions in the first communications protocol and commence transmissions in the second communications protocol. If there are two or more receivers, the first receiver 212A may continue to receive signals from the satellite 104 using the first communications protocol while the second receiver 212B may receive signals using the second communications protocol simultaneously. If there is one receiver, a single receiver 212 may continue to receive signals from the satellite 104 using the first communications protocol at the same time as receiving signals using the second communications protocol, and then process and/or filter to separate the two signals using other components of the Tx/Rx front end 208 or the signal processing unit 210. In this manner, the radio device 102 may communicate using various communications protocols to the satellite 104 using a single transceiver chain 202, thereby reducing the physical bulk of the system 200 and allowing for communications with satellites that use various communications protocols.

In some embodiments, simultaneous operation in two or more communications protocols may refer to processing of incoming signals during the same time instance in the two or more communications protocols. For instance, a certain processing operation on a received signal may occur for one communications protocol while a same, similar or different processing operation may occur for a signal received for another communications protocol. The radio device's antenna 204 may receive signals for two communications protocol at the same time, and may separate or filter the signals for separate/parallel processing. In some embodiments, simultaneous operation refers to the radio device's antenna 204 and/or receiver component(s) being multiplexed at a predetermined frequency in time sufficient to granularly and properly receive and/or process signals for the two communications protocol essentially without loss of the incoming signals.

Now referring to FIG. 3, one embodiment of a method 300 operating in multiple transmission modes for satellite communications is depicted. A controller of a radio device having one or more processors may set a transmission mode of a single transceiver chain coupled to the controller to a first communications protocol (302). The single transceiver chain may communicate with a satellite using the first communications protocol (304). The controller may modify the transmission mode of the single transceiver chain from the first communications protocol to a second communications protocol (306). The controller may maintain synchronization for the first communications protocol (308). The single transceiver chain may, in response to modifying the transmission mode, transmit a first signal to the satellite using the second communications protocol (310). The single transceiver chain may receive a second signal using the first communications protocol and the synchronization for the first communications protocol, and a third signal using the second communications protocol (312).

Referring now to step 302, and in some embodiments, the controller 206 of the radio device 102 having one or more processors may set a transmission mode of a single transceiver chain 202 coupled to the controller 206 to a first communications protocol. In some embodiments, the single transceiver chain 202 may include a first receiver 212A, a second receiver 212B, and a transmitter 214. The radio device 102 and the satellite 104 may use one or more communications protocol in communications with each other. The transmission mode of the transceiver chain 202 may specify or define which communications protocol to use in transmitting signals by t to the satellite 104. The protocol switching module 216 may set the transmission mode of the transceiver chain 202 or the Tx/Rx front end 208 to one of the one or more communications protocols, such as the first communications protocol or the second communications protocol. The protocol switching module 216 may enable transmissions by the transceiver chain 202 or the Tx/Rx front end 208 to the second communications protocol. The protocol switching module 216 may disable transmissions by the transceiver chain 202 or the Tx/Rx front end 208 to the first communications protocol. In some embodiments, the first communications protocol may correspond to a default communications protocol used between the radio device 102 and the satellite 104.

Referring now to step 304, and in some embodiments, the single transceiver chain 202 may communicate with a satellite 204 using the first communications protocol. The satellite 104 may be within a field of view of the antenna 204 of the radio device 102. The transceiver chain 202 or the transmitter 214 may transmit signals via the antenna 204 of the radio device 102 to the antenna of the satellite 204 encoded in the first communications protocol. The transceiver chain 202 may receive signals via the antenna 204 of the radio device 102 from the antenna of the satellite 204 encoded in the first communications protocol. In some embodiments, transceiver chain 202 may also receive signals via the antenna 204 of the radio device 102 from the antenna of the satellite 204 encoded in the second communications protocol. In some embodiments, the first receiver 212A may be dedicated to the first communications protocol and may receive signals from the satellite 104 using the first communications protocol.

Referring now to step 306, and in some embodiments, the controller 206 may modify the transmission mode of the single transceiver chain 202 from the first communications protocol to a second communications protocol. Signals or waveforms in the second communications protocol may lie in a different range of the frequency spectrum from signals or waveforms in the first communications protocol. In modifying or changing the transmission mode, the protocol switching module 216 may disable transmissions of signals by the transceiver chain 202 in the first communications protocol and enable transmissions of signals by the transceiver chain 202 in the second communications protocol. In some embodiments, the controller 206 may modify or change the transmission mode based on a time schedule specifying a first time frame for the communications protocol and a second time frame for the second communications protocol. In some embodiments, the controller 206 may modify or change the transmission mode, responsive to receiving a request or mode identification signal indicating a change in the transmission mode to the second communications protocol.

Referring now to step 308, and in some embodiments, the controller 206 may maintain a synchronization for the first communications protocol. The synchronization may be used by the transceiver chain 202 to align processing or otherwise properly process signals received from the satellite 104 and signals to be transmitted to the satellite 104 encoded in the respective communications protocol. In some embodiments, the controller 206 may maintain the synchronization for the first communications protocol, responsive to modifying the transmission mode from the second communications protocol. In some embodiments, the controller 206 may receive a frame synchronization identifier for the first communications protocol from the satellite 104 and store the frame synchronization identifier in memory at the radio device 102. In some embodiments, the controller 206 may increment a frame synchronization count, at periodic intervals, for the first communications protocol.

Referring now to step 310, and in some embodiments, the single transceiver chain 202 may, in response to modifying the transmission mode, transmit a first signal to the satellite 104 using the second communications protocol. The single transceiver chain 202 or the transmitter 214 may initiate transmissions of signals encoded in the second communications protocol, responsive to the modification of the transmission mode. The single transceiver chain 202 or the transmitter 214 may also terminate transmissions of signals encoded in the first communications protocol, in response to the modification of the transmission mode from the first communications protocol to the second communications protocol.

Referring now to step 312, and in some embodiments, the single transceiver chain 202 may receive a second signal using the first communications protocol and the synchronization, and a third signal using the second communications protocol. Subsequent to the modification of the transmission mode, the single transceiver chain 202 may continue to receive signals encoded in the first communications protocol simultaneous to receiving signals encoded in the second communications protocol. In some embodiments, the first receiver 212A may continue to receive signals from the satellite 104 using the first communications protocol simultaneous to the second receiver 212B receiving signals from the satellite 104 using the second communications protocol. The second receiver 212B may receive signals from the satellite 104 using the second communications protocol, simultaneous to the first receiver 212A receiving signals from the satellite 104 using the first communications protocol. In some embodiments, the transceiver chain 202 may include a single receiver 212 that may receive a first signal using the first communications protocol and a second signal using the second communications protocol simultaneously.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A method of operating in multiple transmission modes for satellite communications, comprising:
   setting, by a controller of a radio device having one or more processors, a transmission mode of a single transceiver chain coupled to the controller to a first communications protocol;
   communicating, by the single transceiver chain, with a satellite using the first communications protocol;
   modifying, by the controller, the transmission mode of the single transceiver chain from the first communications protocol to a second communications protocol;
   maintaining, by the controller, a synchronization for the first communications protocol for the single transceiver chain;
   in response to modifying the transmission mode, transmitting, by the single transceiver chain, a first signal to the satellite using the second communications protocol concurrent to maintaining the synchronization for the first communications protocol; and
   simultaneously receiving, by the single transceiver chain from the satellite, a second signal using the first communications protocol and a third signal using the second communications protocol.

2. The method of claim 1, wherein maintaining the synchronization for the first communications protocol further comprises:
   receiving a frame synchronization identifier for the first communications protocol from the satellite; and
   storing the frame synchronization identifier for the first communications protocol.

3. The method of claim 1, wherein maintaining the synchronization for the first communications protocol further comprises incrementing, at periodic intervals, a frame synchronization count for the first communications protocol and for the satellite.

4. The method of claim 1, further comprising:
   setting, by the controller, a first frequency range of a first filter of the single transceiver chain for passing the second signal encoded in the first communications protocol received from the satellite, the single transceiver chain comprising a transceiver chain of a software defined radio (SDR); and
   setting, by the controller, a second frequency range of a second filter of the single transceiver chain different from the first frequency range, for passing the third signal encoded in the second communications protocol received from the satellite.

5. The method of claim 1, wherein modifying the transmission mode further comprises modifying the transmission mode using a time schedule, wherein the time schedule specifies a first time frame for transmission in the first communications protocol and a second time frame for transmission in the second communications protocol.

6. The method of claim 1, further comprising:
   receiving, by the single transceiver chain, from the satellite, a mode identification signal indicating at least one of a termination of transmissions in the first communications protocol and a commencement of transmissions in the second communications protocol; and
   wherein modifying the transmission mode further comprises modifying the transmission mode of the single transceiver chain responsive to receiving the mode identification signal.

7. The method of claim 1, further comprising tuning, by the controller, an antenna of the radio device to a frequency range that includes a first carrier frequency of the first communications protocol and a second carrier frequency of the second communications protocol to receive, from the satellite, the second signal using the first communications protocol and the third signal using the second communications protocol.

8. A method of operating in multiple transmission modes for satellite communications, comprising:
   setting, by a controller of a radio device having one or more processors, a transmission mode of a single transceiver chain coupled to the controller to a first communications protocol, the single transceiver chain comprising a first receiver, a second receiver, and a transmitter;
   communicating, by the first receiver and the transmitter, with a satellite using the first communications protocol;
   modifying, by the controller, the transmission mode of the single transceiver chain from the first communications protocol to a second communications protocol;
   maintaining, by the controller, a synchronization with the satellite for the first communications protocol for the first receiver of the single transceiver chain;
   in response to modifying the transmission mode, transmitting, by the transmitter, a first signal to the satellite using the second communications protocol concurrent to maintaining the synchronization for the first communications protocol; and
   receiving, from the satellite a second signal by the first receiver using the first communications protocol and a third signal by the second receiver using the second communications protocol concurrent to the transmission mode of the single transceiver chain set to the second communications protocol.

9. The method of claim 8, wherein maintaining the synchronization further comprises storing, by the first receiver, responsive to modifying the transmission mode to the second communications protocol, a frame synchronization identifier for the first communications protocol received from the satellite; the method further comprising:
   processing, by the single transceiver chain, the second signal using the frame synchronization identifier received from the satellite, subsequent to modifying the transmission mode from the first communications protocol to the second communications protocol.

10. The method of claim 8, further comprising:
   passing, by the first receiver, the second signal having a first frequency range and encoded in the first communications protocol received from the satellite;
   passing, by the second receiver, the third signal having a second frequency range different from the first frequency range and encoded in the second communications protocol received from the satellite; and
   passing, by the transmitter, the first signal having the second frequency range encoded in the second communications protocol transmitted to the satellite.

11. The method of claim 8, further comprising:
receiving, by the first receiver, from the satellite, a mode identification signal indicating at least one of a termination of communications in the first communications protocol and a commencement of communications in the second communications protocol; and
wherein modifying the transmission mode further comprises modifying the transmission mode of the single transceiver chain responsive to receiving the mode identification signal.

12. The method of claim 8, wherein maintaining the synchronization further comprises maintaining the synchronization for the first communications protocol, responsive to determining that the satellite is configured to transmit signals encoded in the first communications protocol and the second communications protocol.

13. The method of claim 8, wherein setting the transmission mode to the first communications protocol further comprises disallowing transmission using the second communications protocol to the satellite by the transmitter; and
wherein modifying the transmission mode to the second communications protocol further comprises disallowing transmission using the first communications protocol to the satellite by the transmitter.

14. A system for operating in multiple transmission modes for satellite communications, comprising:
a single transceiver chain of a radio device having one or more processors; and
a controller of the radio device, coupled to the single transceiver chain, configured to set a transmission mode of the single transceiver chain of the radio device to a first communications protocol; wherein:
the single transceiver chain is configured to communicate with a satellite using the first communications protocol;
the controller is further configured to modify the transmission mode of the single transceiver chain from the first communications protocol to a second communications protocol, and to maintain synchronization for the first communications protocol for the single transceiver chain; and
the single transceiver chain is further configured to, in response to the modification of the transmission mode, transmit a first signal to the satellite using the second communications protocol concurrent to maintaining the synchronization for the first communications protocol, and to simultaneously receive, from the satellite, a second signal using the first communications protocol and a third signal using the second communications protocol.

15. The system of claim 14, wherein the controller is further configured to:
receive a frame synchronization identifier for the first communications protocol from the satellite; and
store the frame synchronization identifier for the first communications protocol.

16. The system of claim 14, wherein the controller is further configured to disable transmissions to the satellite using the first communications protocol, responsive to the modification of the transmission mode from the first communications protocol to the second communications protocol.

17. The system of claim 14, wherein the single transceiver chain comprises a transceiver chain of a software defined radio (SDR), a first filter, and a second filter, and wherein the controller is configured to:
set a first frequency range of the first filter for passing the second signal encoded in the first communications protocol received from the satellite; and
set a second frequency range of the second filter different from the first frequency range for passing the third signal encoded in the second communications protocol received from the satellite.

18. The system of claim 14, wherein the controller is further configured to modify the transmission mode using a time schedule, wherein the time schedule specifies a first time frame for transmissions in the first communications protocol and a second time frame for transmissions in the second communications protocol.

19. The system of claim 14, wherein the single transceiver chain is further configured to receive, from the satellite, a mode identification signal indicating at least one of a termination of communications in the first communications protocol and a commencement of communications in the second communications protocol; and
wherein the controller is further configured to modify the transmission mode of the single transceiver chain, responsive to the receipt of the mode identification signal.

20. The system of claim 14, wherein the controller is further configured to tune an antenna of the radio device to a frequency range that includes a first carrier frequency of the first communications protocol and a second carrier frequency of the second communications protocol to receive, from the satellite, the second signal using the first communications protocol and the third signal using the second communications protocol.

* * * * *